United States Patent [19]

Maxwell

[11] 4,133,472

[45] Jan. 9, 1979

[54] METHOD OF SHIPPING AND ASSEMBLING RECTANGULAR STRUCTURAL UNIT

[76] Inventor: Herris M. Maxwell, 2204 Riding Ridge Rd., Columbia, S.C. 29204

[21] Appl. No.: 858,742

[22] Filed: Dec. 8, 1977

Related U.S. Application Data

[62] Division of Ser. No. 768,373, Feb. 14, 1977, abandoned.

[51] Int. Cl.² .................. B23K 31/02; E04B 1/18; E04B 1/35
[52] U.S. Cl. .................. 228/140; 29/155 R; 29/469; 52/745; 228/176; 228/182
[58] Field of Search ............... 29/155 R, 155 C, 469; 228/140, 176, 182; 52/745

[56] References Cited

U.S. PATENT DOCUMENTS

| | | | |
|---|---|---|---|
| 1,948,931 | 2/1934 | Mears | 249/48 X |
| 3,609,929 | 10/1971 | Brown et al. | 52/79.3 X |
| 3,694,990 | 10/1972 | Pamer | 29/155 R |
| 3,710,534 | 1/1973 | McNamara | 52/745 |
| 3,871,146 | 3/1975 | Hamy | 52/79.3 X |
| 4,021,976 | 5/1977 | Colma | 52/745 X |

FOREIGN PATENT DOCUMENTS 760145  6/1967  Canada .................. 52/79.1

Primary Examiner—Al Lawrence Smith
Assistant Examiner—K. J. Ramsey
Attorney, Agent, or Firm—Richards, Shefte & Pinckney

[57] ABSTRACT

A structural unit that is specially formed to include four welded corner sections, which can be temporarily connected together in pairs to form two smaller units for transportation to the point of use, and which can then be assembled together to form a large rectangular structural unit that may have a variety of uses, such as in conveying fluids, or in the construction of buildings, bridges or the like, or in forming tunnels, shafts or the like.

4 Claims, 7 Drawing Figures

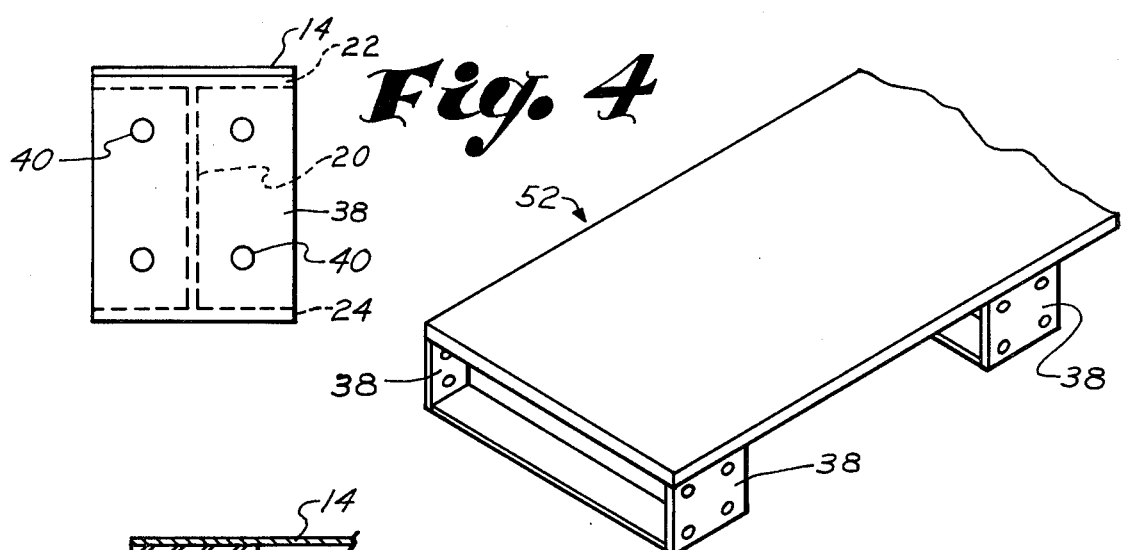
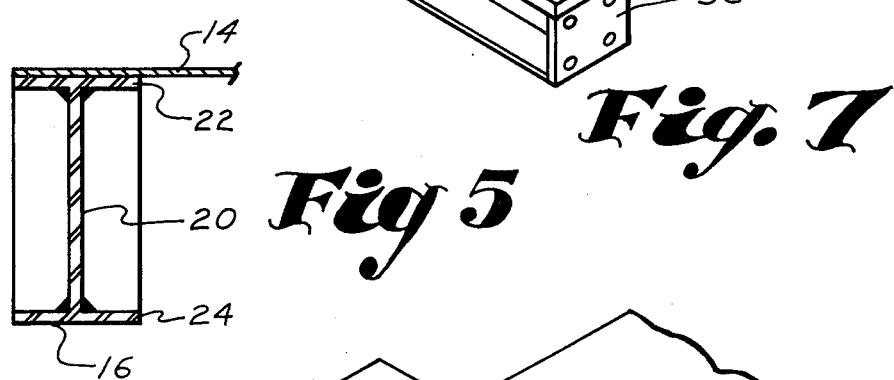
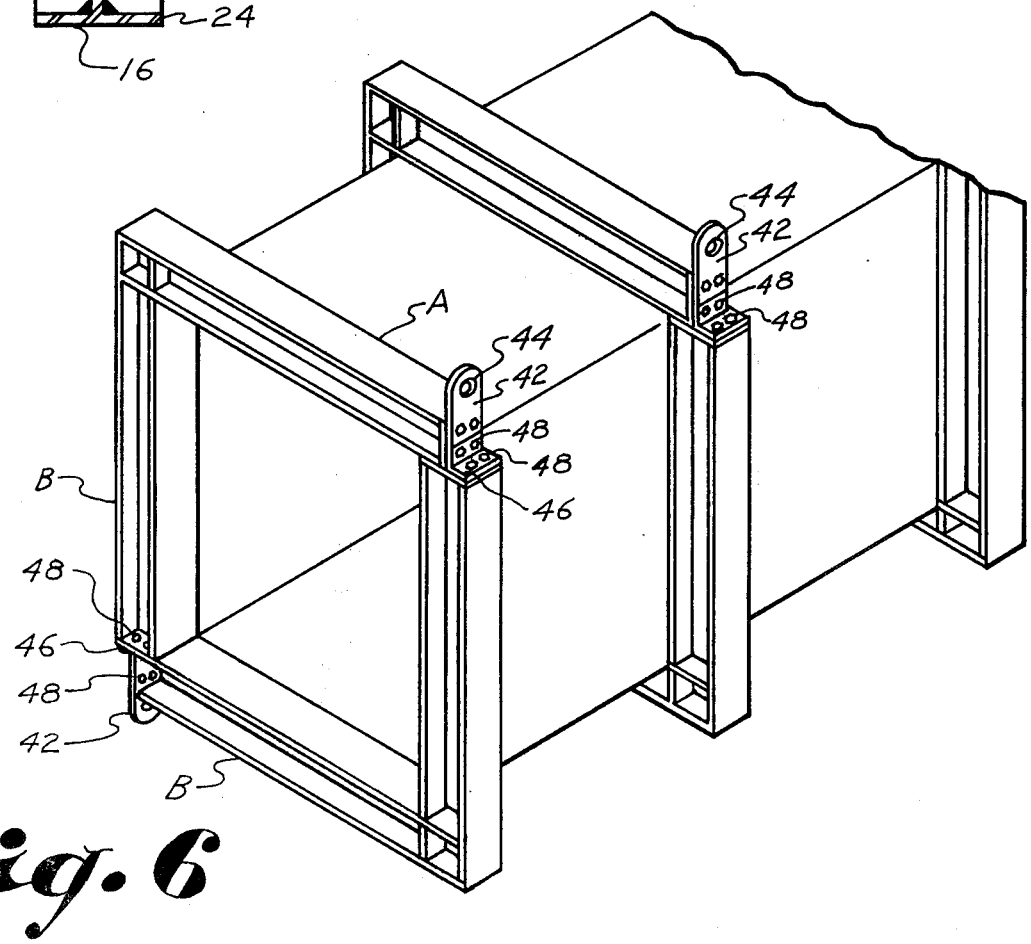

METHOD OF SHIPPING AND ASSEMBLING RECTANGULAR STRUCTURAL UNIT

CROSS-REFERENCE TO RELATED APPLICATIONS

This application is a division of parent application Ser. No. 768,373, filed Feb. 14, 1977, now abandoned.

BACKGROUND OF THE INVENTION

In many fluid handling systems it is necessary to provide exceptionally large enclosed conduits for conveying flue gases, smoke, air and other fluids, a typical example of such a conduit being a 20 foot-by-20 foot retangularly shaped conduit used to convey flue gases in conjunction with a power plant precipitator.

Because of the size and service requirements of these conduits, they must be structurally sound, particularly at the corners where full penetration moment connections are generally required, and it is therefore highly desirable from both economic and structural standpoints to weld the corners of such conduits in a fabricating shop rather than in the field. However, when the size of a finished conduit exceeds the existing size limitations imposed on items shipped by trucks or rail, it has not been feasible to construct a finished conduit in a fabricating shop and then ship such conduit intact, in longitudinal sections, by conventional truck and rail transportation. For example, items shipped by rail cannot have a width exceeding 9 feet or a height of 15 feet, and items shipped by truck cannot have a width exceeding 8 feet or a height of 12 feet, and it will therefore be apparent that the aforementioned typical large conduit having having cross-sectional dimensions of 20 feet-by-20 feet cannot be shipped, in finished form, by either rail or highway transportation.

In addition to being used as a fluid conveyor, as discussed above, large structural units of this general type may be used in a variety of other applications, such as the construction of buildings, bridges and other such structures, and they may also be used in the formation of tunnels, mine shafts and the like. Because of their size, structural units of this type cannot be fabricated as a completed unit and then shipped because they would exceed existing transportation size limitations, and they would therefore encounter the same transportation difficulties set forth above.

Accordingly, it is now common practice to partially fabricate a large rectangular structural unit in a fabricating shop by forming a plurality of flat panel sections having dimensions which permit them to be shipped to the job site by conventional rail or highway transportation, and then welding these panels together at the site when they arrive. Because, as mentioned above, the corners of the finished conduit must usually have full penetration moment connections to withstand service loads, the welding of the four corners of the finished duct involves relatively difficult field fitting and welding techniques that must be carried out by experienced welding personnel who must be available at the job site. In addition to the inherent difficulties of field welding as compared with welding at a fabricating shop designed for this purpose, this field welding also requires the presence, at the job site, of experienced welding personnel, all of which adds significantly to the cost of producing a finished large structural unit.

By substantial contrast, the present invention provides a means of specially forming a large structural unit so that it consists of sections that can be readily transported to a job site, and that can then be structurally joined at the job site by relatively simple connections and welding techniques that do not require a significant number of experienced welding personnel.

SUMMARY OF THE INVENTION

In accordance with the present invention, a large rectangular structural unit is formed to include four corner sections, each consisting of two leg members welded together (e.g. at a fabricating shop) to extend from such weld in perpendicular relation to one another. Each leg member is provided with connecting means that permits it to be connected to the leg member of another corner section, and preferably, each leg member corresponds in extending length to that of the leg member of another corner section.

By maintaining the extending length of each leg member of a corner section within the above-described size limitations imposed on items shipped by rail and highway transportation, it is possible to join temporarily two corner sections into a transportable unit, and to then permanently join the four corner sections together at the job site to form the finished structural unit, it being noted that this permanent joining of the four corner sections at the job site does not require any welding at the corners of the structural unit because of the prefabrication of such corners prior to shipment.

For example, if a finished structural unit is to have cross-sectional dimensions of 20-by-20 feet, the corner sections can be formed with one leg thereof having an extending length of 8 feet and with the other leg thereof having an extending length of 12 feet, whereby two corner sections can be temporarily joined into a rectangular shipping module having cross-sectional dimensions of 8 feet-by-12 feet, such dimensions being within the aforesaid shipping limitations. Upon arrival at the job site, two temporary shipping modules are then disconnected, and the four corner sections are joined together to form the 20-by-20 foot finished structural unit.

Preferably, each leg member of each corner section includes a plurality of reinforced structural members spaced from one another along the longitudinal length thereof with each such reinforced structural member being welded to a corresponding reinforced structural member of another leg member to form a corner, and a flat liner plate extends between the plurality of reinforced structural members of each leg member to form a smooth interior wall surface for the finished structural unit. The edges of these flat liner plates can be joined to the adjacent edges of the flat liner plates in other corner sections by relatively simple seam welds to seal the finished structural unit. If desired or necessary, flat liner plates may also be mounted exteriorly of the reinforced structural members, with or without the interior flat liner plates, and joined together by connecting plates or other suitable connections.

Finally, while the longitudinal length of a corner section, and a temporary shipping unit formed therefrom, may be limited (e.g. 50 feet) to remain within rail and highway shipping requirements, a finished structural unit section consisting of four corner sections can be joined lengthwise to additional finished structural unit sections to provide a structural unit of any desired length, all without requiring any welding at the corners of the structural unit.

BRIEF DESCRIPTION OF THE DRAWINGS

FIG. 4 is a detail view illustrating an end plate of a leg member;

FIG. 5 is a detail view taken at section lines 5—5 in FIG. 2;

FIG. 6 is a perspective view of two corner sections joined together as a shipping unit; and FIG. 7 is a perspective view of an extension section which may be used in extending the dimensions of a finished structural unit.

DESCRIPTION OF THE PREFERRED EMBODIMENT

Figure 1:
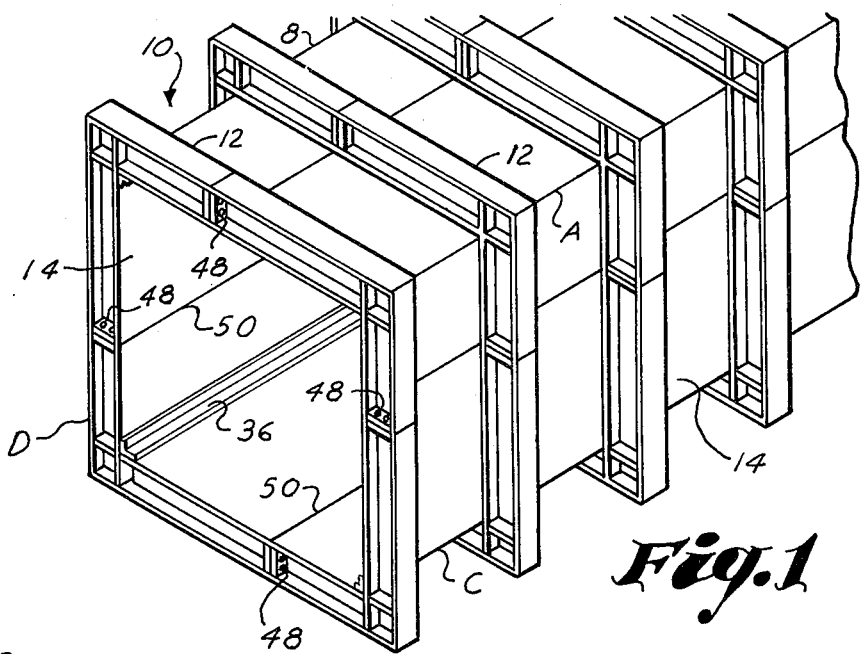
FIG. 1 is a perspective view of a finished rectangular structural unit formed in accordance with the present invention.

Looking now in greater detail at the accompanying drawings, FIG. 1 illustrates a large rectangular structural unit 10, which may be a conduit or other type of structural unit mentioned above, including a plurality of rectangularly shaped reinforced structural frames 12 spaced from one another along the longitudinal length of the structural unit 10, and including a sealed interior wall surface formed by flat liner plates 14 welded or otherwise joined to the inner faces of the frames 12 to extend therebetween along the length of the structural unit 10.

Figure 2:
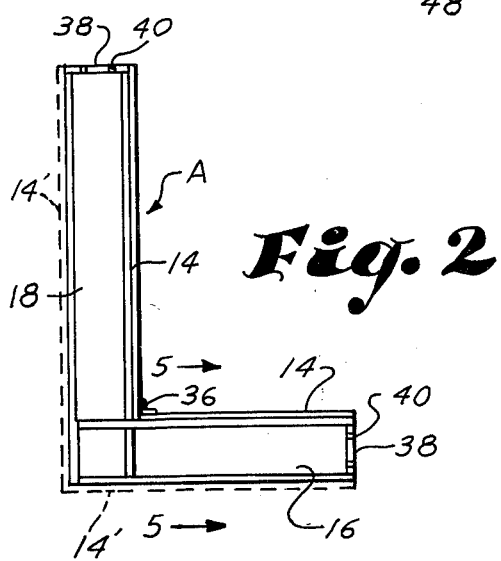
FIG. 2 is an end view of one corner section of the structural unit illustrated in FIG. 1.

In accordance with the present invention, the structural unit 10 is formed by four corner sections A, B, C and D, each of which has a longitudinally extending length so as to include a plurality of parts of the frames 12 with the liner plates 14 extending therebetween. In the disclosed embodiment of the present invention, all four of these corner sections A-D are identical, and the reinforced structural frame portion 12 of one such corner section A is illustrated in greater detail in FIG. 2. This corner section A includes two leg members 16 and 18 welded together to extend from the welded joint in perpendicular relation to one another, and each leg member 16 and 18 includes an I-beam 20, 20', respectively, having spaced parallel flanges 22, 24, and 22', 24', respectively (see FIG. 5). Because of the service loads which will be imposed on the conduit 10, it is generally necessary to weld the leg members 16 and 18 together with a full penetration moment connection, e.g. a connection which is capable of developing a strength at least equal to the strength of the I-beams 20 of the leg members 16 and 18, and the forming of such a connection requires relatively difficult welding techniques as illustrated in FIG. 3.

Figure 3:
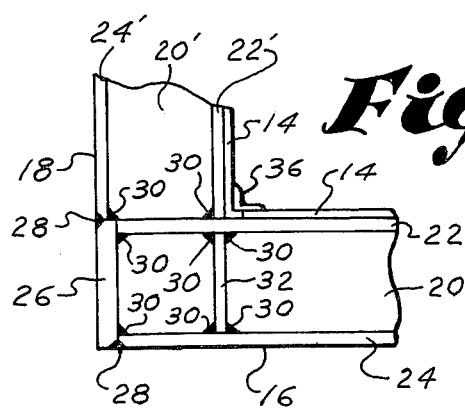
FIG. 3 is a detail view illustrating the welded joint of two leg members forming a corner section.

Thus, the I-beam 20' of the vertical leg member 18 is positioned with the flanges 22' and 24' thereof lying perpendicular to, and in abutment with, the top flange 22 of the I-beam 20 of the horizontal leg member 16 as shown in FIG. 3, and a first reinforcing plate 26 is arranged across the ends of flanges 22 and 24 so as to form an extension of the flange 24' of leg member 18. The two I-beams 20 and 20' and the first reinforcing plate 26 are then welded together by a groove weld 28 at the point of contact between flange 24 and first reinforcing plate 26, and by fillet welds 30 located at the points of contact of flanges 22' and 24' with the top surface of flange 22. A similar groove weld 28 and a fillet weld 30 are formed at the point of contact between the flange 24 and the first reinforcing plate 26 as shown in FIG. 3. Additionally, a second reinforcing plate 32 is disposed between the flanges 22 and 24 of I-beam 20 to form an extension of flange 22' of I-beam 20' and four fillet welds 30 secure this second reinforcing plate 32 to the flanges 22 and 24. Finally, it is to be understood that a further second reinforcing plate (not shown), identical to second reinforcing plate 32 is similarly welded between flanges 22 and 24 on the opposite side of the web portion of I-beam 20. The result of all of the above is that the welded corner connection between leg members 16 and 18 is a full penetration moment connection that enables the corner to withstand readily the loads which will be normally imposed thereon when the structural unit 10 is placed in use.

When the structural unit 10 is used as a conduit for gases, it is usually necessary for the interior of the structural unit 10 to be sealed against leakage. Accordingly, a flat steel liner plate 14 may be welded, respectively, to the inner faces of flanges 22 and 22' of each leg member 16 and 18 included in a corner section, and at each corner an angle iron 36 is welded by a continuous fillet weld (not shown) to the adjacent ends of the perpendicularly disposed liner plates 14 as best shown in FIG. 3, thereby forming a sealed interior surface for the structural unit 10.

In some applications of the structural unit 10, it may be desirable or necessary to provide liner plates at the exterior surface of the structural unit 10. As shown in dotted lines in FIG. 2, such exterior liner plates 14' may be mounted along the exterior surface of flanges 24 and 24' of each leg member 16 and 18 included in a corner section. These exterior liner plates 14' may be joined by a right-angle connecting plate, like connecting plate 36, welded at the juncture of the exterior liner plates 14' and extending longitudinally between adjacent I-beams 20 and 20'. It is to be understood that the interior liner plates 14 and the exterior liner plates 14' may be used together or separately, depending on the requirements of the intended use of the finished structural unit 10.

The extending end of each leg member 16 and 18 is provided with flat connection plates 38 that are welded to the end faces of the I-beams 20 and 20' so as to present a flat connecting face disposed in perpendicular relation to the direction of extent of the leg members 16 and 18, respectively, and each connecting plate 38 is provided with a plurality of apertures 40 as best illustrated in FIG. 4.

If desired, each corner section A-D may also be provided with either or both of two handling flanges 42 temporarily connected at the corner connection and at the connecting plate 38 so as to project therefrom and present an aperture 44 that can be engaged by a hook or similar device associated with an elevated crane (not shown) at the job site whereby a corner section, which will be quite heavy, can be carried to a position adjacent another corner section and then manipulated with respect thereto to permit joining of the corner sections as will be explained in greater detail below.

Four identical corner sections A-D can be made, as described above, at a fabricating shop where the relatively difficult welds required, particularly at the corner joints, may be effectuated by experienced welding personnel using shop facilities designed for this purpose. Although the finished structural unit 10 to be formed by these four corner sections A-D may be too large for shipping, as discussed above, any two of the corner sections may be temporarily connected together as shown in FIG. 6 to form a relatively small transportable unit. This temporary connection can be readily carried out by disposing the leg members of one corner section in adjacent perpendicular relation to the leg members of another corner section as shown in FIG. 6, and employing temporary angle irons 46 and bolts 48 to connect the end plates 38 of each of the adjacent leg members to form thereby a secure rectangular module having dimensions which permit it to be readily transported from the fabricating shop to the job site by conventional highway or rail transportation.

When these shipping modules arrive at the job site, they are disconnected to separate the individual corner sections A-D, and all four of these corner sections A-D are then reassembled to form a large finished structural unit 10 as illustrated in FIG. 1. This reassembly is carried out by connecting the extending leg member of one corner section to the extending leg member of another corner section, with the end plates 38 thereof abutting one another and bolts 48 passing therethrough, so that such leg members are arranged in extending alignment with one another. The abutting edges of the interior and/or exterior liner plates of each two connected leg members may then be seam welded, as shown for example by reference numeral 50 in FIG. 1, to provide a sealed interior and/or extension surface for the structural unit 10. This seam weld is the only welding operation required at the job site, and it is a relatively easy weld which can be made quickly even by welders who do not have a great deal of experience.

The length of the extending leg members of a corner section is determined by the dimensions of the finished structural unit 10 and the size limitations imposed on items shipped by rail or highway transportation. Thus, if the finished structural unit 10 is to have dimensions of 20 feet-by-20 feet, in cross-section, the corner sections A-D are each made with one leg member thereof having an extending length of 8 feet and the other leg member thereof having an extending length of 12 feet. Using these dimensions, two corner sections can be temporarily connected, as shown in FIG. 6, to provide a shipping module having dimensions of approximately 8 feet-by-12 feet in cross-section, which is within the aforementioned shipping size limitations. When four corner sections are joined together as shown in FIG. 1 with an 8 foot leg member of one corner section aligned with the 12 foot leg member of another corner section, a finished structural unit 10 of 20 feet-by-20 feet is formed. If, on the other hand, the finished structural unit 10 is to have other dimensions (e.g. 16 feet-by-16 feet), the leg members may have dimensions selected to stay within the transportation size limitations (e.g. each leg member having a length of 8 feet) and to provide the desired dimensions for the finished structural unit.

Also, it is to be noted that the finished structural unit 10 may have any desired extending length. While shipping requirements will limit the extending length (e.g. 50 feet) of the corner sections A-D and the transportable shipping modules formed thereby, four corner sections A-D can be used to form one structural unit section that can be joined to similarly formed conduit sections to provide a finished structural unit of any desired extending length. When these structural unit sections are joined, it is simply necessary to weld the seams at the abutting ends of the liner plates 14 of adjacent conduit sections in the same manner as that described above in conjunction with seams 50. Moreover, in some applications where it is desired to form the structural unit in an unsupported or cantilever fashion, the structural unit sections could be joined together at spliced locations intermediate the frames 12 by bolted or welded splice plates fixed to the liner plates 14 at the intermediate spliced location whereby each structural unit section is supported by the next adjacent structural unit section as it is mounted in place.

A further advantage of the structural unit of the present invention is realized in applications where the structural unit is used to form underground tunnels, shafts and the like where the corner sections A-D must be passed through the partially formed tunnel as its extending length is increased. Since the dimensions of the corner sections A-D are less than the overall interior dimensions of a finished structural unit section, these corner sections may be readily transported through finished structural units which are in place and mounted at the end thereof in extending the length of the tunnel or shaft as it is being constructed.

Finally, it is within the scope of the present invention to use flat extension sections 52 such as shown in FIG. 7 which are identical to the leg members of the corner sections and have connecting plates 38 welded to each end of each reinforcing portion thereof, and which can be readily connected between the aligned leg members of two corner sections to thereby extend the dimensions of the finished structural unit. Thus, if a finished structural unit is to have cross-sectional dimensions of 25 feet-by-25 feet, extension sections 52 having a width of 5 feet are bolted between an 8 foot leg member and a 12 foot leg member, with both edges of the extension section liner plate 14 being seam welded to the liner plates 14 and/or 14' of the two leg members. These extension sections 52, since they are flat, may be stacked and shipped together as a unit.

The present invention has been described in detail above for purposes of illustration only and is not intended to be limited by this description or otherwise to exclude any variation or equivalent arrangement that would be apparent from, or reasonably suggested by, the foregoing disclosure to the skill of the art.

I claim:

1. A method of pre-forming, transporting and assembling a rectangular shaped structural unit, said method comprising the steps of:
   (a) forming a plurality of four corner sections, each said corner section being formed by welding two leg members together to extend from said weld in perpendicular relation to one another, with said leg members of each said corner section having an extending length corresponding to the extending length of at least one of other leg members of another corner section;
   (b) temporarily connecting said four corner sections into two relatively small transportable units, each transportable unit consisting of two corner sections arranged in a rectangular disposition with the leg members of one corner section disposed in perpendicular relation to at least one of the leg members of the other corner section; and
   (c) disconnecting said two transportable units and connecting said four corner sections together to form a relatively large rectangular structural unit in which each leg of each corner section is arranged in extending alignment with at least one leg member of another corner section.

2. A method of pre-forming, transporting and assembling a rectangular shaped structural unit as defined in claim 1 and further characterized in that each said corner section has one leg member longer than the other, in that the shorter leg member of one corner section is disposed in perpendicular relation to the longer leg member of the other corner section when said two corner units are temporarily connected together to form said transportable unit, and in that said shorter leg member of each corner section is arranged in extending alignment with the longer leg member of another corner section when said corner units are connected together to form said structural unit.

3. A method of pre-forming, transporting and assembling a rectangular shaped structural unit as defined in claim 1 and further characterized in that each said leg member is formed by locating a plurality of reinforced structural members in spaced parallel relation to one another and welding a flat liner plate to the inner face of said reinforced structural members whereby said liner plate extends between said reinforced structural members.

4. A method of pre-forming, transporting and assembling a rectangular shaped structural member as defined in claim 1 and further characterized in that each said leg member is formed by locating a plurality of reinforced structural members in spaced parallel relation to one another and welding a flat liner plate to the exterior face of said reinforced structural members whereby said liner plate extends between said reinforced structural members.

* * * * *